United States Patent
Clauss (12)

(10) Patent No.: US 6,381,932 B1
(45) Date of Patent: May 7, 2002

(54) HARVESTING MACHINE

(75) Inventor: Steffen Clauss, Dellfeld (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/550,846

(22) Filed: Apr. 17, 2000

(30) Foreign Application Priority Data

Apr. 23, 1999 (DE) ......................................... 199 18 552

(51) Int. Cl.⁷ ............................................... A01D 75/18
(52) U.S. Cl. .............................. 56/10.2 J; 56/DIG. 15; 460/2
(58) Field of Search ....................... 56/10.2 J, DIG. 15, 56/10.2 R, 10.4, 10.2 G; 460/2, 1, 6; 340/684, 551

(56) References Cited

U.S. PATENT DOCUMENTS

| | | | | | |
|---|---|---|---|---|---|
| 4,322,937 A | * | 4/1982 | Hollmann | .................... | 56/10.2 |
| 4,907,400 A | * | 3/1990 | Roden | ......................... | 56/10.4 |
| 5,092,818 A | * | 3/1992 | Bohman et al. | ................ | 460/2 |
| 5,819,512 A | * | 10/1998 | Steffen et al. | ............ | 56/10.2 R |
| 5,921,071 A | * | 7/1999 | Paquet et al. | ................. | 56/16.6 |
| 6,105,347 A | * | 8/2000 | Behnke | ..................... | 56/10.2 J |

FOREIGN PATENT DOCUMENTS

| | | |
|---|---|---|
| DE | 196 48 126 A | 5/1998 |
| DE | 197 42 060 A | 5/1999 |
| EP | 0 403 899 | 12/1990 |

OTHER PUBLICATIONS

Abstract for DE 3919889A.*
Abstract for EP 0403899A1.*

* cited by examiner

*Primary Examiner*—Thomas B. Will
*Assistant Examiner*—Meredith C. Petravick (57) ABSTRACT

A harvesting machine includes a crop intake arrangement including either a reel or a crop hold down which operate to aid in the advancement of harvested crop into the machine for further processing. In the event of a jam or the presence of metal occurring, the crop intake arrangement may be operated in reverse so as to expel the jam and/or sensed metal. An actuator is provided for moving the reel or crop hold down between non-operating and operating positions and a first sensor for sensing a jam condition and/or the presence of metal is provided which sends a signal when such a condition exists, this signal being used to effect automatic operation of said actuator so as to move the reel or hold down to a non-operating position so as not to interfere with the expulsion of the jam and/or metal. Other controls are provided and other parameters are sensed for delaying and/or overriding the automatic positioning of the reel or crop hold down in their non-operating position. One such parameter is provided by a timing device which prevents automatic positioning of the reel or crop hold down when the signal indicating a jam or the presence of metal does not endure for a pre-selected time interval. Another parameter is provided by a sensing device which determines whether or not the machine is traveling in the forward direction. If it is, after a jam or the presence of metal is sensed, then a signal is issued which causes the reel and/or hold down to be returned to its operating position.

8 Claims, 6 Drawing Sheets

HARVESTING MACHINE

The invention concerns a harvesting machine with a crop intake arrangement that can be reversed in order to remove a jam and/or the intrusion of undesirable materials, and that is equipped with a supply element, whose position can be changed from an operating position to a non-operating position.

BACKGROUND OF THE INVENTION

In combines, forage harvesters and other agricultural harvesting machines, various differing front attachments, for example, pick-up and cutter platforms or heads, are used to supply the harvested crop material. Hold downs attached to the pick-up in various configurations or the reel attached to a cutter platform for grain crops on a combine provide for an improved intake and thereby the uniform processing of the harvested crop. In the state of the art, forage harvesters are protected as a rule against damage or destruction of the knife drum or other significant components by metal detectors. If a reversal of the crop intake arrangement becomes necessary due to the response of the metal detector, the hold down must be raised so as to avoid interference with the ejection of the harvested crop. With an unexpectedly high crop supply, the crop intake arrangement can encounter jams particularly if the full power capability of the machine is utilized. In this case, a reversal of the crop intake arrangement is also necessary which requires the raising of the reel of a combine or the hold down of a pick-up. The raising must be performed by the operator most appropriately before the reversal or simultaneously with the start of the reversal process. As a rule, separate known operating arrangements are provided for the reversal and the raising of the reel or the hold down, which makes the operation relatively cumbersome.

In EP-403 889 A, it is proposed that a reversing gear and an arrangement for the removal of a hold down from the operating region of a collecting drum be controlled by a common switch. However, the raising of the hold down will not be desirable in all cases in which reverse operation is performed. Since the hold down is raised only with the activation of the reverse operation, it is also conceivable that crop may jam at the beginning of the reverse operation. This condition would not be feared if the hold down had been raised earlier, however, this is not possible with the control arrangement described.

The problem underlying the invention is seen as that of the known harvesting machines having reels or crop hold downs which do not operate in an entirely safe or efficient manner especially when the feeding of crop must be reversed.

SUMMARY OF THE INVENTION

According to the present invention, there is provided an improved arrangement for use with a harvesting machine which ensures free ejection of crop or metal from the machine by reversing crop feed elements of the intake arrangement.

A more specific object of the invention is to provide a harvesting machine, as discussed above, equipped with a jam sensor and/or an undesirable material detector which each produce a signal when a jam or undesirable material is present, and to use this signal in a control arrangement, such as to cause a reel or a crop hold down to be moved to a non-operating position so as to permit the free flow of crop and/or undesirable material upon reversal of the crop feed elements.

Yet another object of the invention is to provide a harvesting machine, as defined in the immediately preceding object, wherein the control arrangement is coupled for receiving a timing device signal so as to effect operation to block movement of the reel or crop hold down to their respective non-operating position unless the signal indicating a jam or the presence of metal persists for a predetermined time interval.

Still another object of the invention is to provide controls whereby an operator may take overt action for overriding the movement of the reel or crop hold down to their respective non-operating position.

These and other objects will become apparent from a reading of the ensuing description together with the appended drawings.

DESCRIPTION OF THE PREFERRED EMBODIMENT

Figure 1:
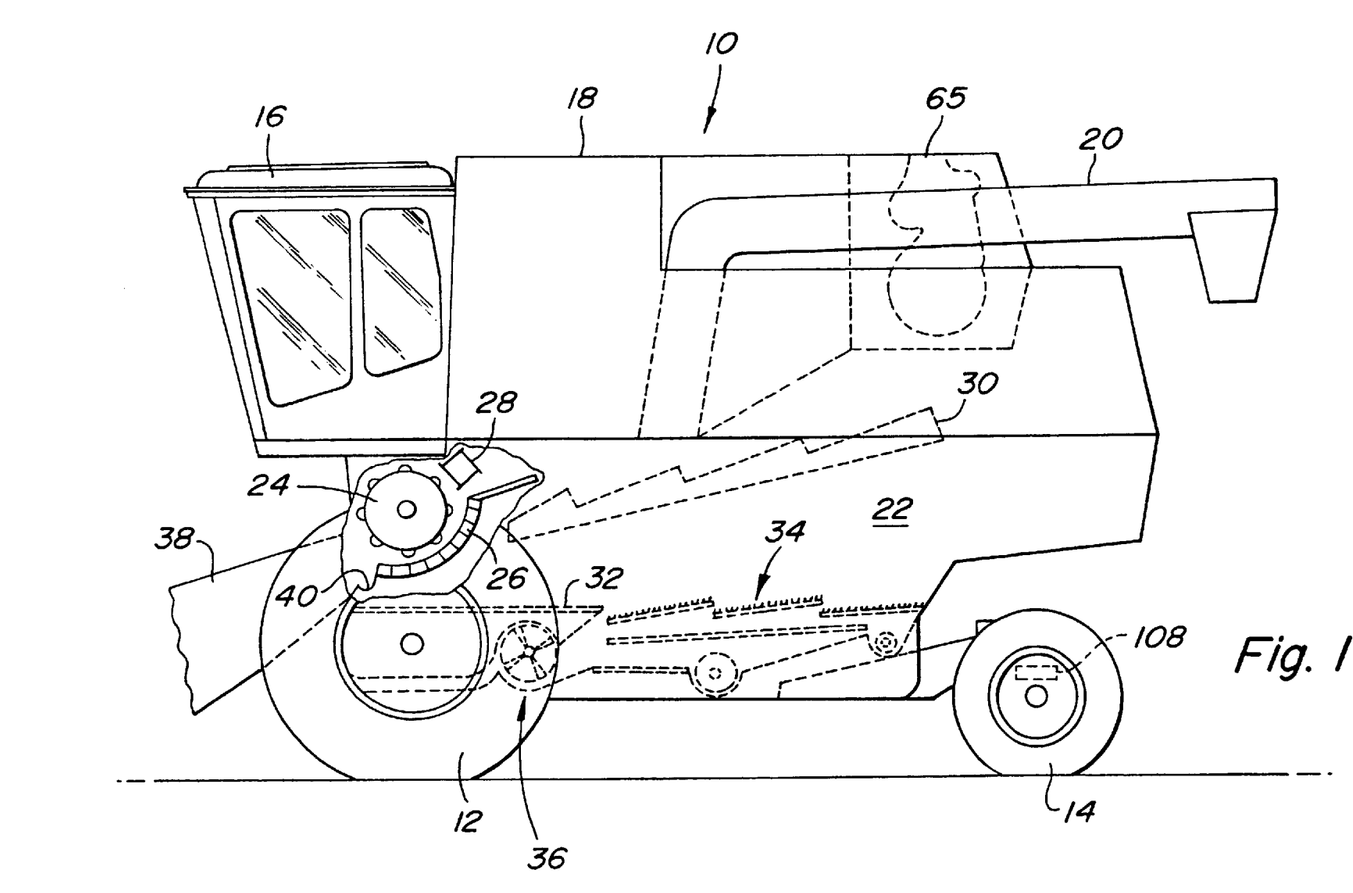
FIG. 1 is a left side elevational view of a combine equipped with a control arrangement constructed in accordance with the principles of the present invention.

Referring now to FIG. 1, there is shown a harvesting machine in the form of a combine 10 supported on front driven wheels 12 and rear steerable wheels 14. An operator's cab 16 is supported ahead of a grain tank 18 and its discharge pipe 20 on a frame 22. Located beneath the cab 16 at the front of the frame 22 is a thresher drum 24, a thresher stator 26 and a deflecting drum 28; and following these elements for the further separation of grain from the straw are shakers 30, a preparation chute and sieves 34. Finally the threshed out portion of the crop is conveyed into the grain tank 18, the large crop components are deposited on the ground over the rear end of the shakers 30 and the lighter components are blown from the sieves 34 and also onto the ground by means of a blower 36. After being taken up from the ground by a crop intake arrangement 50 shown in FIG. 2, crop lying or standing on the ground is conducted over a slope conveyor 38 and a stone catcher trough 40 the thresher drum 24.

Figure 2:
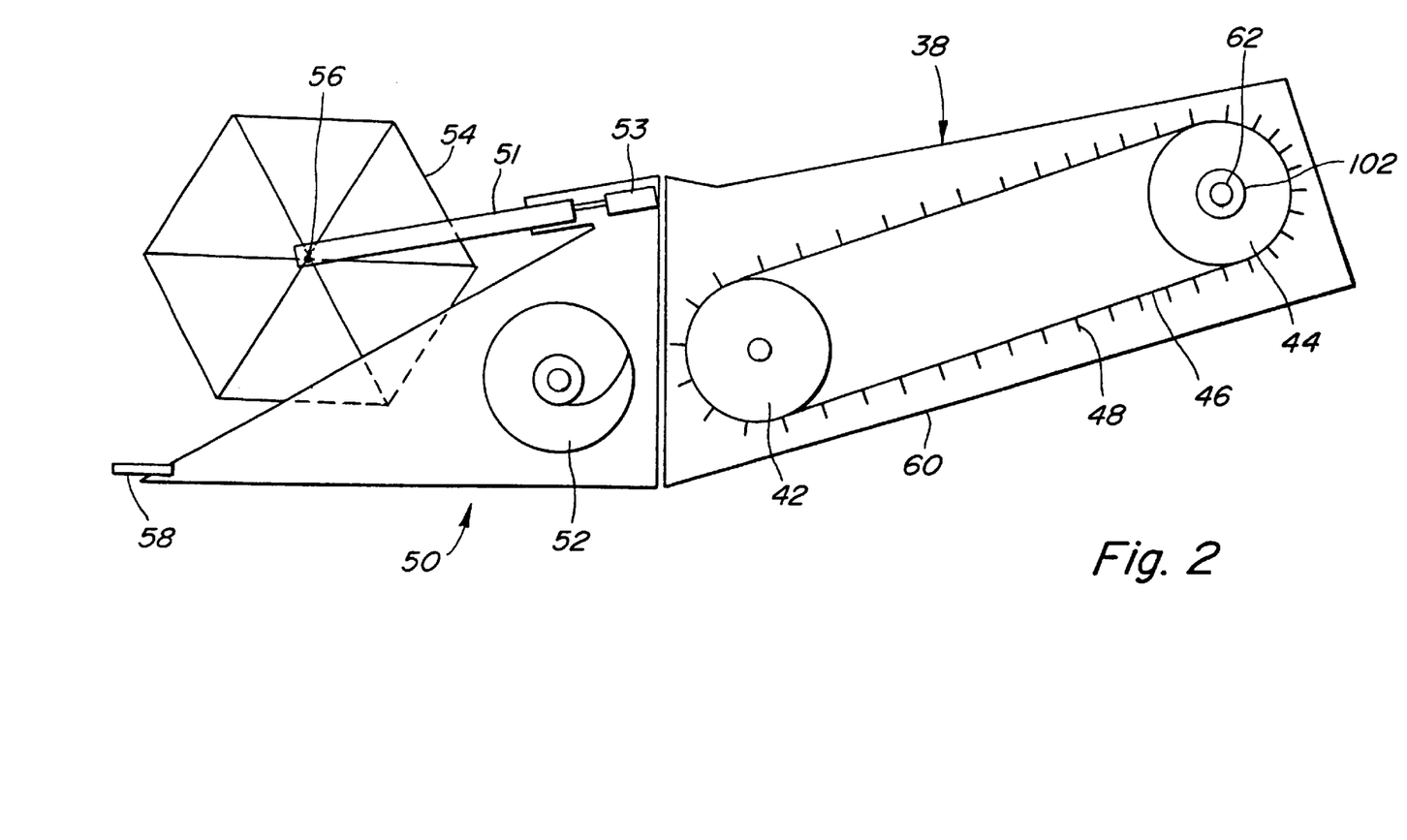
FIG. 2 is a left side view of a crop intake arrangement for the combine of FIG. 1.

From the view point of forward harvesting operation of the combine 10, crop intake arrangement 50, shown in FIG. 2, is fastened, so as to be removable, to the forward surface of the slope conveyor 38. As a rule this removable fastening is accomplished by hooks. The crop intake arrangement 50 is equipped with a sickle bar arrangement 58 for the cutting of crop, in particular grain crops, from the ground. The cut crop is conducted to a screw conveyor 52, by a reel 54 which, as viewed in FIG. 2, is driven counterclockwise about a transverse axis 56, the screw conveyor 52, in turn, delivers the crop to the slope conveyor 38. The reel 54 can be adjusted in its position through a telescoping rod 51 and a hydraulic cylinder 53, in place of which a correspondingly controlled electric motor could be used. The reel 54 can be brought, by means of the hydraulic cylinder 53, from a normal operating position, in which crop is taken in, into a non-operating position in which jammed crop can again be ejected by reversal of the slope conveyor 38, the screw conveyor 52 and the reel 54. In the non-operating position, the reel 54 is spaced a greater distance from the screw conveyor 52 than when in the operating position. The slope conveyor 38 is provided with a housing 60, in which an endless conveyor chain 46 with intake rails 48 circulates about a lower slope conveyor roll or sprocket 42 and an upper slope conveyor roll or sprocket 44. The latter roll 44 is supported on a shaft 62 and is driven by a drive coupled to the shaft 62. The conveyor chain 46 with the intake rails 48 conveys the harvested crop, operating as an under shot conveyor into the combine 10.

Figure 3:
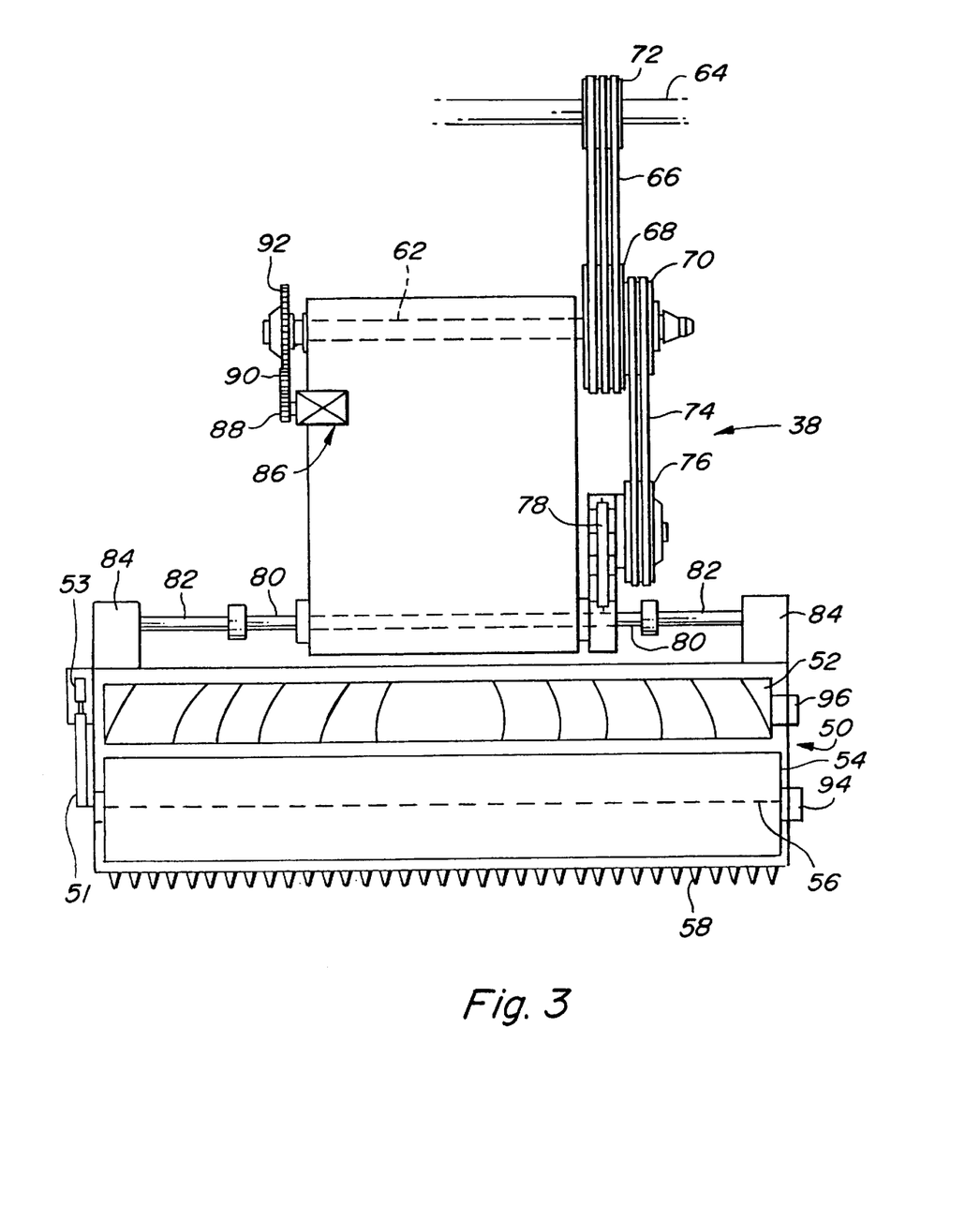
FIG. 3 is a top plan view of the crop intake arrangement of FIG. 2.

Referring now to FIG. 3, the drive elements for the slope conveyor 38 and the crop intake arrangement 50 can be seen. A shaft 64 is driven (as a rule indirectly) from an engine 65 (FIG. 1) of the combine 10. The shaft 64 may be the shaft of the thresher drum 24 or the shaft of the deflecting drum 28. A belt pulley 72 is fastened to the shaft 64 and carries a triple belt 66. In addition, the belt 66 runs about a belt pulley 68 that is connected with a coaxial belt pulley 70 about which a further belt 74 circulates. The belt pulleys 68 and 70 are penetrated by the shaft 62 of the upper slope conveyor roll 44. At the end opposite the belt pulleys 68 and 70, the shaft 62 is connected over a chain sprocket 92, a chain 90 and a further chain sprocket 88 with a reversible motor 86. An electric clutch (not shown) is arranged within the belt pulley 72 with which the belt pulley 72 can be coupled to and uncoupled form the shaft 64. The chain sprocket 92 on the shaft 62 of the upper slope conveyor roll 44 is also equipped with an electric clutch (not shown) with which it can be coupled to and uncoupled from the shaft 62. The belt 74 circulates about a belt pulley 76 positioned at the forward end of the slope conveyor 38, which, for its part, drives a chain drive gearbox 78. The chain drive gear box 78 drives a hexagonal shaft 80 that is connected, so as to be removable, to either side of the slope conveyor 38 with the sickle bar drive shafts 82. The sickle bar drive shafts 82 are connected over gearboxes 84 with the sickle bar arrangement 58. The axle 56 of the reel 54 can be driven by means of a hydraulic motor 94, and the screw conveyor 52 can also be brought into rotation by a hydraulic motor 96.

In normal harvesting operation, the electric clutch in the belt pulley 72 is engaged, and the engine of the combine 10 drives the shaft 62 of the upper slope conveyor roll 44 through the belt 66 and the belt pulley 68. The sickle bar arrangement 58 is also driven by the engine through the belt pulley 70, that is joined together with the belt pulley 68, the belt 74, the belt pulley 76, the chain drive gear box 78, the hexagonal shaft 80, the sickle bar drive shafts 82 and the gear box 84. The screw conveyor 52 is driven by the hydraulic motor 96, and the reel 54 is driven by the hydraulic motor 94. The electric clutch in the chain sprocket 92 is operated to disengage the drive connection between the reversible motor 86 and the shaft 62 of the upper slope conveyor roll 44. In reverse operation, that is, in case jammed crop is to be ejected, the electric clutch in the belt pulley 72 is disengaged, and the electric clutch in the chain sprocket 92 is engaged. Then the reversible motor 86 drives the conveyor chain 46 of the slope conveyor 38 in the backward (reversed) direction, while the hydraulic motors 94 and 96 are also operated in the reverse direction. This reverse operation is known in itself and therefore does not require any detailed explanation.

Figure 4:
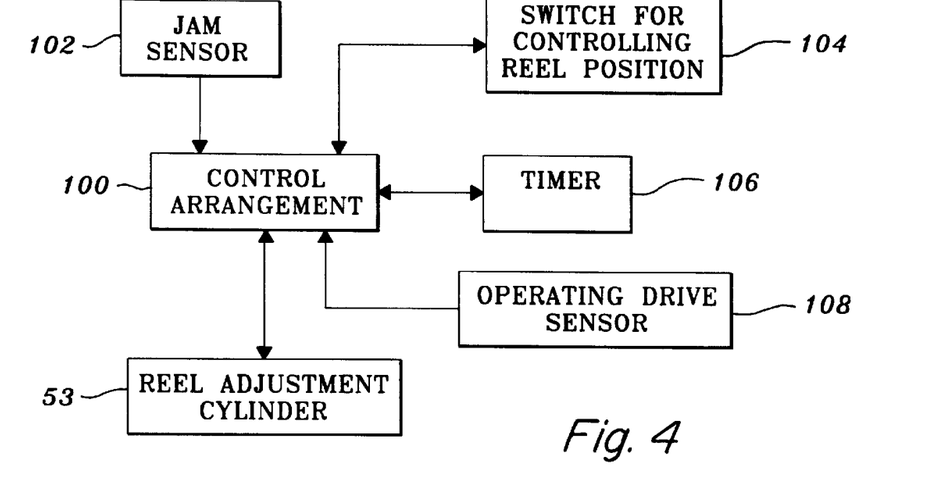
FIG. 4 is a block diagram of the circuit embodying a control arrangement of the combine of FIG. 1.

According to the invention, the control circuit shown in FIG. 4 is provided on the combine 10. A control arrangement 100 that may be a separate microprocessor or controller, or is part of the electronic control of the combine 10, is connected to a jam sensor 102, a switch 104 for the input of the position of the reel, a time function element 106 and an operating drive sensor 108. Furthermore, the control arrangement 100 controls, through appropriate electrical and/or mechanical arrangements, the hydraulic cylinder 53, that is used to adjust the position of the reel 54. For the jam sensor 102, for example, a torque sensor may be provided on the shaft 62 of the upper slope conveyor roll 44, as shown in FIG. 2. The switch 104 is arranged in the operator's cab 16 within reach of the operator, for example, on the instrument panel, an operating lever, a console or the like. The switch 104 is provided with a non-operating position, in which the reel 54 is brought into its non-operating position appropriate for reverse operation and ejection of jammed crop, and an operating position in which the reel 54 is in its operating position for normal harvesting operation. The operating drive sensor 108 is connected with one of the wheels 12 or 14 and transmits a corresponding signal to the control arrangement 100 when the combine is operated in the forward direction. The time function element 106 is triggered by the control arrangement 100 and transmits a corresponding signal back to the control arrangement 100 after a predetermined time interval.

The sequence of the functions of the control arrangement 100 is such that the hydraulic cylinder 53 is brought into the non-operating position for the reel 54 when the switch 104 is in its non-operating position. If the switch 104 is in the operating position, a test is made to determine whether the jam sensor 102 indicates a jam. If this is not the case, then the hydraulic cylinder 53 is activated and brings the reel 54 into the operating position. If the jam sensor 102 indicates a jam, then the reel 54 remains in the non-operating position and a malfunction is indicated to the operator through a corresponding indicating device. If the jam sensor 102 detects a jam during the harvesting operation, that is, at a time when the reel 54 is already in operation, then the time function element 106 is activated. After the time function element 106 of the control arrangement 100 has signaled the expiration of the predetermined time interval, for example, a few seconds, the control arrangement tests whether the operating drive sensor 108 has transmitted signals for the entire time interval or just then transmits a signal, indicating that the combine is operating in the forward direction. If this is the case, then the reel 54 remains in the operating position, otherwise it is brought into the non-operating position. Thereby the operator can, if necessary, prevent the automatic movement of the reel 54 into the non-operating position by simply continuing to operate in the forward direction, if a reverse operation does not appear necessary. The movement of the reel 54 into the non-operating position can also be prevented by a single actuation (turning it off and on) of the switch 104 within the time interval. Furthermore, it is conceivable that the reel 54 may also be brought into the operating position by the control arrangement 100 when the operating drive sensor 108 transmits a signal indicating forward operation, after the control arrangement 100 has been induced by the jam sensor 102 to bring the reel 54 into the non-operating position.

Figure 5:
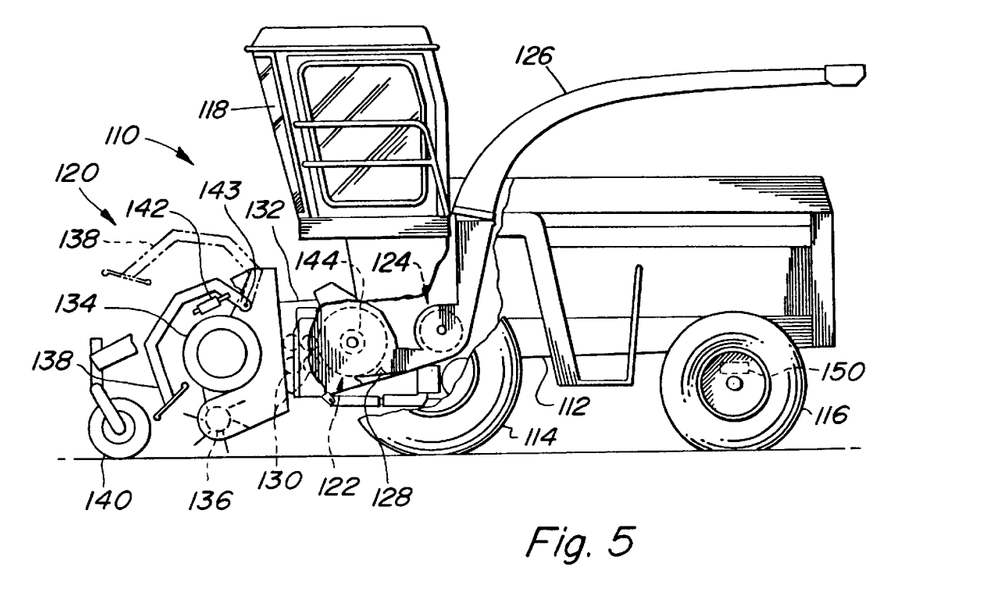
FIG. 5 is a left side elevational view of a forage harvester equipped with a control arrangement constructed in accordance with the principles of the present invention.

FIG. 5 shows a harvesting machine in the form of a self-propelled forage harvester 110 in which a control arrangement 100' (FIG. 6), according to a second embodiment of the invention, is provided. The forage harvester 110 includes a frame 112 that is carried by front and rear wheels 114 and 116, respectively. The forage harvester 110 is controlled from an operator's cab 118 from which a crop intake arrangement 120 can be seen and controlled by the operator. Crop taken up from the ground by means of the crop intake arrangement 120, for example, corn, grass or the like, is conducted over feed rolls 130 arranged within an intake housing 132, to a chopper drum 122 which chops the crop into small pieces and conducts it to a conveyor arrangement 124. The crop leaves the forage harvester 110 to an accompanying trailer through a discharge duct 126 which may be swung about a substantially vertical axis. Between the chopper drum 122 and the conveyor arrangement 124, a post-chopper reduction arrangement 128 extends, through which the crop to be conveyed is conducted tangentially to the conveyor arrangement 124.

In this embodiment, the crop intake arrangement 120 is configured as a so-called pick-up and designed as an independent unit. However, this crop intake arrangement 120 could equally well be a supplementary attachment that is attached, for example, in a flange to the front region of the cutter head of a combine. The crop intake arrangement 120 is supported on the ground on support wheels 140. The task for the crop intake arrangement 120 consists of picking up crop of the most diverse type and condition lying on the ground in windrows or swaths and to conduct it to the forage harvester 110 for further processing. For this purpose, the crop intake arrangement 120 is moved over the field during the harvesting operation at a small spacing from the ground, while it is raised for transport over a road or on paths. The crop intake arrangement 120 contains a conveying arrangement 134 in the form of a screw conveyor 134 that conveys, in a manner known in itself, the crop, that has been picked up, from the sides of the crop intake arrangement 120 to a delivery opening, not shown, located in the center, behind which the feed rolls 130 follow, to which the conveyor arrangement delivers the crop through a rotationally driven intake device 136, arranged underneath the conveyor arrangement 134, and raises the crop from the ground with its conveyor tines, in order to transfer it to the conveyor arrangement 134, and a hold down 138 in the form of a sheet metal component arranged above the intake device 136. Alternatively, the hold down 138 could be in the form of rolls or contain several rods. The rotational axis of the conveyor arrangement 134 and a pivot axis 143 of the hold down 136 extend parallel to each other and to the ground and transverse to the direction of operation of the forage harvester 110. The relative position of the conveyor arrangement 134 to the intake device 136 cannot be changed. The relative position of the hold down 138 can be adjusted between the operating position, in which the hold down 138 is shown in FIG. 5 in solid lines, and in which the hold down 138 interacts with the intake device 136, and a non-operating position, shown in dashed lines. For this purpose, a hydraulic cylinder 142 is provided (that could also be replaced by an electric motor), which pivots the hold down 138 correspondingly about a horizontal axis defined by a pivot pin 143. The non-operating position of the hold down 138 is shown to be necessary in reverse operation, in which the feed rolls 130, the conveyor arrangement 134 and the intake device 136 (optimally also the chopper drum 122) are operated in a direction of rotation opposite to the normal harvesting operation, in order to be able to eject jammed material. The reverse operation is performed, in a manner known in itself, with associated reversible motors. Even if a metal detector 145 (shown only in block form in FIG. 6 but not otherwise disclosed), that is arranged within one of the feed rolls 130, responds, and stops the drive of feed rolls 130, a reverse operation is still necessary to expel the metal material along with crop material.

Figure 6:
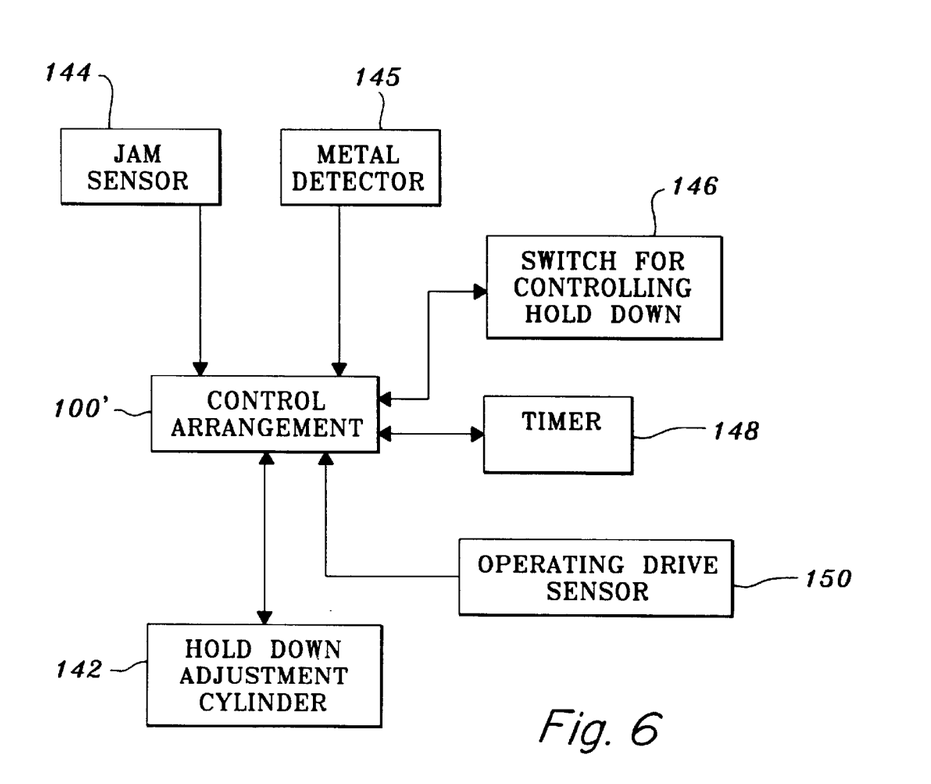
FIG. 6 is a block diagram of the circuit embodying the control arrangement of the forage harvester of FIG. 5.

FIG. 6 shows a circuit diagram in principle of the control circuit for the hydraulic cylinder 142 for the adjustment of the hold down 138. A control arrangement 100' is connected to a jam sensor 144, the aforementioned metal detector 145, that is stationary and arranged in the interior of one of the feed rolls 130, a switch 146 installed in the operator's cab 118 for the input of the desired position of the hold down 138, a time function element 148, an operating drive sensor 150 and the hydraulic cylinder 142. The control arrangement 100' may be a separate microprocessor or a controller or it may be a part of the electronic control of the forage harvester 110. The jam sensor 144 detects whether the feed rolls 130 and/or the chopper drum 122 are blocked by an excess of harvested crop supplied. Therefore, it measures the drive torque of one of the feed rolls 130 and/or the chopper drum 122, and transmits a corresponding signal to the control arrangement 100' when a threshold value is exceeded, which the latter interprets as a jam. The metal detector 145 is known in itself, and therefore does not require any further explanation. It transmits a corresponding signal to the control arrangement 100', in case ferromagnetic material is conducted past the feed rolls 130, which could damage the chopper drum 122. Furthermore the metal detector 145 effects actuation of a device that mechanically blocks the feed rolls 130 in case of a response. The switch 146 is easily accessible for an operator within the operator's cab 118, arranged on the instrument panel, an operating lever, a console or the like and is provided with an operating position, in which the hold down 138 is to be brought into the operating position. In addition the switch 146 is provided with a non-operating position for effecting operation of the hydraulic cylinder 142 so as to bring the hold down 138 into its non-operating position shown in dashed lines in FIG. 5. The time function element 148 can be triggered by the control arrangement 100' and transmits a signal back to the control arrangement 100' after the expiration of a certain time interval (of a few seconds). The operating drive sensor 150 is connected to one of the wheels 114 and 116, and transmits a signal to the control arrangement 100' that contains information showing whether the forage harvester 110 is being operated in the forward direction. The control arrangement 100' controls the hydraulic cylinder 142, over appropriate electronic, mechanical and/or hydraulic components, for the adjustment of the position of the hold down 138.

The operation of the control arrangement 100' is generally identical to that shown in FIG. 4. A difference consists of the fact that not only the response of the jam sensor 144 (102 in FIG. 4), but also that of the metal detector 145 lead to the actuation of the time function element 148. After the expiration of the cycle of the time function element 148, the hold down 138 is brought into non-operating position by the hydraulic cylinder 142, or not, depending on whether the operating drive sensor 150 detected a forward operation for the entire time interval of the operation of the time function element and on whether the switch 146 for the position of the hold down 138 was activated.

Figure 7:
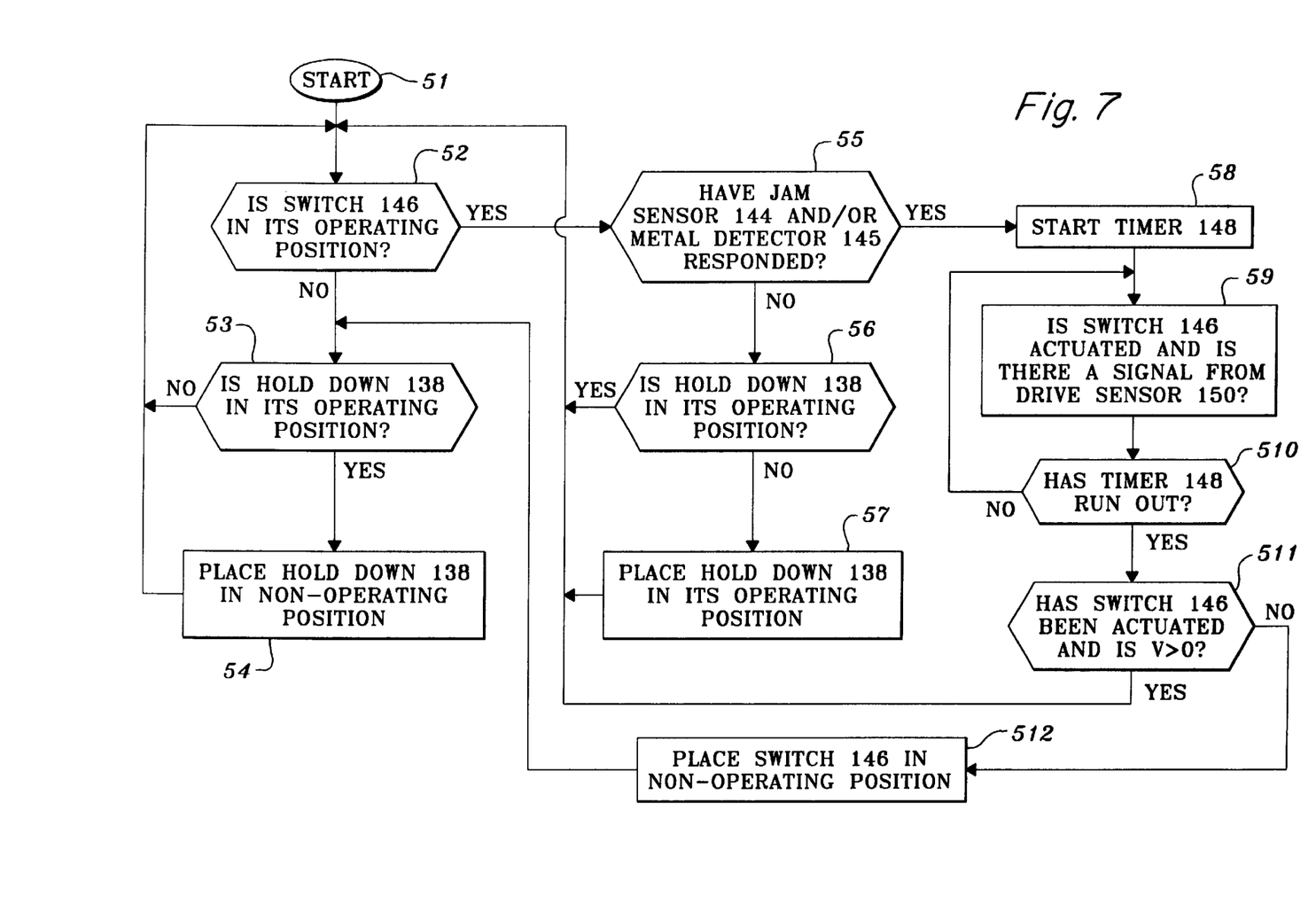
FIG. 7 shows a flow diagram of the operational steps effected by the control arrangement.

FIG. 7 shows a flow diagram to clarify the method of operation of the control arrangement 100' of FIG. 6. After the start in step S1, for example, with the starting of the forage harvester 110, S2 initially tests whether the switch 146 is in the operating position. If the result of the test is "no", S3 tests whether the hold down 138 is in the operating position; this can be performed by an appropriate sensor or an interrogation of a memory in which the last actual or required position of the hold down 138 is stored. If the hold down 138 is not in the operating position, step S2 follows again. Otherwise, the hold down 138 is brought into the non-operating position, in step S4, which is performed by activating the hydraulic cylinder 142. Thereupon, step S2 again follows. If step S2 has found that the switch 146 is in the operating position, then step S5 follows, which tests whether the jam sensor 144 and/or the metal detector 145 have responded. If this is not the case, step S6 follows, which tests (in the aforementioned manner) whether the hold down 138 is in the operating position. If that is the case, step S2 follows again, otherwise step S7 follows, in which the hold down 138 is brought into the operating position by means of the hydraulic cylinder 142, whereupon step S2 again follows. If in step S5 the jam sensor 144 and/or the metal detector 145 has responded, then in step S8 the time function element 148 is started, and step S9 tests whether the switch 146 is actuated and the output signal of the operating drive sensor 150 is detected and step S10 tests whether the time function element 148 has run its course. If this is not the case, step S9 again follows, otherwise step S11, which tests whether the switch 146 has been actuated or whether the velocity at that point in time (or during the entire run of the time function element 148) is grater than zero. If the result is "yes" the hold down 138 is not raised and step S2 follows. Otherwise step S12 follows in which the switch 146 is brought into its non-operating position (by means of an appropriate electromechanical arrangement), and upon which step S3 again follows. Then the hold down 138 is brought into the non-operating position and the switch 146 is switched into its non-operating position. The operator can then remove the jam or the metallic object that intruded by reversing the intake devices.

What is claimed is:

1. In a harvesting machine including a crop intake arrangement that can be reversed in order to remove a jam or undesirable material, the crop intake arrangement including a crop intake-aiding component that is mounted for movement between a normal operating position, wherein it is located adjacent a path through which crop flows during normal operation for engaging said crop, and a non-operating position spaced away from said path, and an actuator coupled to said crop intake-aiding component for selectively moving it between said operating and non-operating positions, the improvement comprising: a sensor for detecting at least one of jam or undesirable material and producing a signal representative of said jam or undesirable material; and a control arrangement operatively coupled between said actuator and said sensor, and being responsive to said signal for causing said actuator to automatically move said crop intake-aiding component to its non-operating position before any reversal of the crop intake arrangement occurs, whereby said crop intake arrangement may then be reversed without any hindrance to the removal of the jam or undesirable material by said crop intake-aiding component.

2. The harvesting machine, as defined in claim 1, and further including a first operating element coupled to said control arrangement and to a control circuit for said actuator; said first operating element being movable between a non-operating position, wherein it effects operation of said actuator so as to place said crop intake-aiding component in its corresponding non-operating position, and an operating position wherein it effects operation of said actuator so as to place said crop intake-aiding component in its corresponding operating position.

3. The harvesting machine, as defined in claim 2, wherein said first operating element is automatically moved to its non-operating position in response to a signal from said sensor.

4. The harvesting machine, as defined in claim 1, wherein a timing device is coupled to said control arrangement and is turned on in response to a signal from said sensor; and said acutator being operated to effect movement of said crop intake-aiding component to said non-operative position only after expiration of a predetermined time interval.

5. The harvesting machine, as defined in claim 3, wherein said first operating element may be manually operated to override automatic operation thereof so that an operator may selectively retain said crop intake-aiding component in its operative position if it is determined that reverse operation of the crop intake arrangement is not required.

6. The harvesting machine, as defined in claim 1, and further including a direction sensor coupled for sensing the direction of movement of said harvesting machine and producing a signal representative of such direction; said direction sensor being coupled to said control arrangement with the latter operating to control said actuator for returning said crop intake-aiding component to its operating position in response to a signal representing forward movement of said harvesting machine.

7. The harvesting machine, as defined in claim 1, wherein said intake-aiding component is a reel.

8. The harvesting machine, as defined in claim 1, wherein said intake-aiding component is a crop hold down.

\* \* \* \* \*